United States Patent
Le Van Suu

(10) Patent No.: US 6,212,658 B1
(45) Date of Patent: Apr. 3, 2001

(54) METHOD FOR THE CORRECTION OF A MESSAGE IN AN INSTALLATION

(75) Inventor: Maurice Gilbert Le Van Suu, Romainville (FR)

(73) Assignee: SGS-Thomson Microelectronics S.A., Gentilly (FR)

( * ) Notice: Subject to any disclaimer, the term of this patent is extended or adjusted under 35 U.S.C. 154(b) by 0 days.

(21) Appl. No.: 08/300,599

(22) Filed: Sep. 2, 1994

(30) Foreign Application Priority Data

Sep. 2, 1993 (FR) .................................................. 93 10474

(51) Int. Cl.$^7$ ........................................................ H04L 1/18
(52) U.S. Cl. .................... 714/749; 375/133; 340/310.01; 455/62
(58) Field of Search ..................................... 714/749, 762, 714/751; 375/133, 347; 340/310.01–310.06; 455/62

(56) References Cited

U.S. PATENT DOCUMENTS

| | | | |
|---|---|---|---|
| 4,479,215 | * 10/1984 | Baker | 371/33 |
| 4,549,297 | * 10/1985 | Nishimoto | 371/33 |
| 4,589,111 | 5/1986 | Adachi . | |
| 4,829,526 | * 5/1989 | Clark et al. | 371/35 |
| 5,105,423 | * 4/1992 | Tanaka et al. | 371/5.5 |
| 5,159,465 | * 10/1992 | Maemura et al. | 358/405 |
| 5,224,105 | * 6/1993 | Higley | 371/32 |
| 5,289,582 | * 2/1994 | Hirata et al. | 395/275 |
| 5,491,463 | * 2/1996 | Sargent et al. | 340/310.01 |

FOREIGN PATENT DOCUMENTS

| | | |
|---|---|---|
| 0254846 | 2/1988 | (EP) . |
| 0520877 | 12/1992 | (EP) . |
| 0319270 | 1/1994 | (EP) . |

OTHER PUBLICATIONS

Jerry M. Rosenberg, Dictionary of Computers, Information Processing, and Telecommunicatin 249 (2nd ed. 1987).*

* cited by examiner

Primary Examiner—William Grant
Assistant Examiner—Sheela S. Rao
(74) Attorney, Agent, or Firm—Theodore E. Galanthay; Allen, Dyer, Doppelt, Milbrath & Gilchrist, P.A.

(57) ABSTRACT

A method for the accurate transmission of a message between a transmitter and a receiver that are connected to a transmission line supplied by the mains system. The method includes means for distinguishing between errors caused by line attenuation and errors caused by parasitic pulses. Once the cause of the errors is known, messages can be sent at appropriate different transmission rates and, if necessary, synchronously with the frequency of the mains system.

11 Claims, 2 Drawing Sheets

METHOD FOR THE CORRECTION OF A MESSAGE IN AN INSTALLATION

CROSS-REFERENCE TO RELATED APPLICATION

This application claims priority from French App'n 93-10474, filed Sep. 2, 1993, which is hereby incorporated by reference.

BACKGROUND AND SUMMARY OF THE INVENTION

The present invention relates to a method for the correction of a message to be transmitted between a transmitter and a receiver that are distributed on an information transmission line of an installation supplied by the mains supply system.

The invention can be applied with particular advantage, but not exclusively, to the field of the management of computerized home automation systems.

Computerized home automation systems generally comprise a plurality of appliances and devices distributed on an information transmission line. These may be domestic appliances as such, for example television sets, refrigerators, washing machines, radiators etc. or, again, one or more control stations designed to receive instructions or information elements pertaining to the operation of the other appliances and devices. These instructions are, for example, "OFF" or "ON" commands coming from a user or from the appliances and devices themselves. In turn, the control station or stations send commands to the other appliances and devices of the installation in the form of messages that make it possible to obtain the desired modifications of operation.

To send these commands, different types of media are commonly used for the information transmission line, for example carrier current, coaxial cables, twisted pairs, infrared radiation and RF channels as well as optic fibers, ultrasound etc. Although its application is very general, the invention relates more particularly to carrier current which is the preferred medium used for home automation installations.

The installation envisaged here may be of the centralized intelligence type, with a control station exchanging messages with other devices that play the role of slave stations. In a distributed intelligence type of installation, each device can play the role of master or slave by self-programming without going through a control station which, for its part, only listens to the messages.

Until now, the appliances and devices intended for integration into a home automation installation have been designed by manufacturers to work in a given configuration of reception defined by a control message transmission rate that depends on the type of device concerned. It is thus that heating appliances can work at a relatively low rate of 300 baud, this rate being, however, substantially insufficient for lighting appliances which require a transmission rate that is substantially higher, at least 2400 baud.

In order to enable these different devices and appliances to coexist on one and the same information transmission medium, steps towards achieving compatibility were begun in 1991, the aim being to lay down a signal transmission rate of 1200 baud.

However, it must be expected that, in the relatively near future, devices working at higher rates of information transmission, 2400 baud for example, are likely to be connected to installations that comply with the prevailing standard.

This is why, in order to obtain the fullest possible compatibility, the trend is towards the development of devices that can send and receive messages at a minimum of two information transmission rates. A system for the transmission of data in an installation of this type, comprising devices such as these, is described in the European patent application No 93401231. 1, which is hereby incorporated by reference.

Furthermore, home automation applications may be the site of numerous disturbances likely to affect the transmission of the messages moving along the lines. These disturbances are of two types, i.e. 1) recursive parasitic pulses produced by devices such as motors, glow-discharge tubes and induction furnaces and, 2) variations in the line impedance of the installation, through resistive, capacitive or inductive causes, leading to an attenuation of the amplitude of the bits while they are being propagated between a transmitter and a receiver that are relatively distant from each other on the transmission line. In both cases, the receiver instrument is in no position to understand the messages sent to it, either because the bits that form these messages are deformed by the parasitic phenomena or because they arrive with an excessively low amplitude.

SUMMARY OF THE INVENTION

Hence, the technical problem to be resolved by the present invention is that of proposing a method for the correction of a message to be transmitted between a transmitter and a receiver that are distributed on an information transmission line of an installation supplied by the mains system, said line being the site of disturbances liable to affect the transmission of said message, and each device being capable of sending and receiving data elements at a minimum of two transmission rates, said correction method enabling the receiver to receive and decipher the message sent by the transmitter in spite of disturbances of the line.

In one embodiment of this correction method, when the disturbances of the transmission line are caused by a line attenuation that lowers the amplitude of the bits of the message to be transmitted to the point where they can no longer be detected by the receiver, the method follows the following steps:

a) The transmitter sends a control message at a first transmission rate, along with a request for acknowledgment from the receiver.

b) When there is no acknowledgment due to disturbances, the transmitter sends, at another transmission rate, a correction message that is synchronous with the frequency of the mains along with a request for obligatory acknowledgment from the receiver. The correction message contains information elements and a correction algorithm prepared by the sender. This correction algorithm is created when the sender compares the known bits which it desired to send with the bits actually transmitted on the line.

In this instance, because the disturbance is caused by a line attenuation, the correction algorithm will indicate that no errors were detected.

c) When there is an acknowledgment of the correction message, the transmitter sends, at the second transmission rate, the control message with a request for acknowledgment from the receiver.

d) When there is no acknowledgment of the correction message, then the transmitter sends, at yet another transmission configuration, the message to be transmitted with a request for acknowledgment from the receiver. This continues until an acknowledgement is received.

Alternatively, the message to be transmitted may not be received due to recursive parasitic pulses that deform certain bits individually, thus making the message incomprehensible to the receiver. In this instance, the correction algorithm will show that errors in the transmission were detected.

Thus, in the invention, the structure of the correction algorithm makes it possible to know the origin of the disturbances and to make the appropriate correction to the message.

In the case of parasitic recursive pulses, whether or not they are combined with an attenuation of the line, the method will comprise the following steps:

a) The transmitter sends a control message at a first transmission rate, with a request for acknowledgment from the receiver.

b) When there is no acknowledgment due to disturbances, the transmitter sends, at another transmission rate, a correction message that is synchronous with the frequency of the mains, with a request for obligatory acknowledgment from the receiver. Thus far, the steps are the same as in the earlier case. In this instance, since the disturbance is at least partly due to parasitic recursive pulses, the correction algorithm will indicate that at least one error was discovered between the message intended and the actual message transmitted on the line.

c) When there is an acknowledgment of the correction message, the transmitter sends the control message at the second transmission rate AND synchronously with the frequency of the mains system with a request for acknowledgment from the receiver.

d) When there is no acknowledgment of the correction message, the transmitter sends, at yet another transmission rate, a correction message that is synchronous with the frequency of the mains, with a request for obligatory acknowledgment by the receiver. This message contains a new correction algorithm that is generated for this transmission.

If the new correction algorithm indicates errors from parasitic pulses, the method is resumed at step b), else the method is resumed at step b) of the earlier method corresponding to the line attenuation of the transmission line.

In general, assuming that there are disturbances related to parasitic pulses, changing the transmission rate to either a lower rate or a higher rate will be enough to enable the receiver to decipher the message that is sent to it or to detect a line attenuation, in which case the corresponding correction method described here above will be used. Furthermore, the acknowledgment delivered by the receiver in response to the correction message indicates that this message has been received properly.

However, in order to prevent an unforeseen parasitic pulse from accidentally disturbing the line during the sending of the message, one embodiment provides that in the event of doubt concerning at least one received bit of the message to be transmitted, the receiver will carry out a correction operation by means of the correction algorithm of the previously received and acknowledged correction message.

In any case, step d) is repeated until the transmitter receives acknowledgment requested or until a repetitions counter has completely run its course.

The general working of the correction method according to the invention, which shall be described in detail further below, is as follows:

First, a message is sent to the receiver at a first transmission rate. If the disturbances of the line are such that the receiver cannot receive or understand the message, then the requested acknowledgment is not sent to the transmitter which then detects the fact that an anomaly has occurred on the line. So that the message can nevertheless be transmitted despite the deteriorated conditions of operation of the line, the transmitter formulates a shortened correction message that it sends synchronously with the frequency of the mains and at another transmission rate making it possible to attenuate the effect of the disturbances.

Furthermore, the correction message includes a correction algorithm prepared by the transmitter by comparison between the known bits that it intends to send and the actual bits that are transmitted on the line. The way in which this correction algorithm is built shall be seen further below. The only point that shall be noted here is that the transmitter is capable of making a distinction between a correction algorithm which indicates a disturbance by parasites and one which does not.

The correction message also includes a request for acknowledgment that enables the transmitter to know whether it has been truly received by the receiver. If it has not been received, the transmitter sends a new correction message at yet another transmission rate If the disturbance is of parasitic origin, and if the receiver can receive the correction message, then this receiver detects the synchronism with the mains frequency which is an indication of the corrective character of the message received, and sends out the requested acknowledgment message. The correction algorithm is stored in the memory of the receiver along with its synchronization with the mains system.

The receiver is then capable of receiving the message to be transmitted, sent synchronously with the mains system, by the transmitter. It is also capable, at any time, of correcting error bits by means of the algorithm.

If the disturbance is an attenuation along the transmission line which is revealed by the correction algorithm, possibly after the correction of the parasites, the transmitter sends the message to be transmitted at the same transmission rate as the one at which the acknowledged correction message had been sent.

If the acknowledgment has not been received, then the transmitter again sends the message at yet another transmission configuration.

The term "transmission configuration" is understood here to mean the set of values constituted by the transmission rate AND the gain of the transmitter for, should there be a line attenuation, the transmission can be restored by a variation in transmission rate as well as by a variation in gain.

The last-named operation is repeated as many times as necessary, i.e. so long as an acknowledgment has not been given by the receiver.

It is also possible to provide for a repetitions counter that limits the number of repetitions beyond a certain number, thus preventing a message that comes too late to the receiver and has lost its utility.

Naturally, the correction method which is an object of the invention can be implemented only if the transmitter and the receiver are capable of sending and receiving at several transmission rates and of recognizing the transmission rate received.

BRIEF DESCRIPTION OF THE DRAWINGS

The disclosed inventions will be described with reference to the accompanying drawings, which show important sample embodiments of the invention and which are incorporated in the specification hereof by reference, wherein.

The following description, made with reference to the appended drawings which are given by way of nonrestrictive examples, will provide a clear picture of the content of the invention and of the manner in which it can be achieved.

DETAILED DESCRIPTION OF THE PREFERRED EMBODIMENTS

Figure 1:
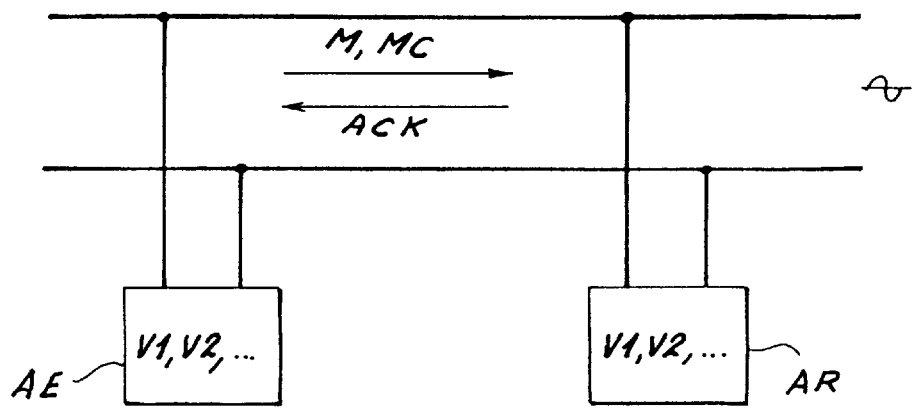
FIG. 1 is a drawing showing an installation comprising a transmitter and a receiver that are distributed on a carrier current line.

The numerous innovative teachings of the present application will be described with particular reference to the presently preferred embodiment (by way of example, and not of limitation), in which: FIG. 1 gives a schematic view of an information transmission line CP of an installation supplied by the mains supply system. Along this line, there are distributed a transmitter AE and a receiver AR capable of sending and receiving data elements at a minimum of two transmission rates V1, V2, the transmitter AE having to transmit a message M to the receiver AR despite the presence of disturbances located in the transmission line CP.

Figure 3:
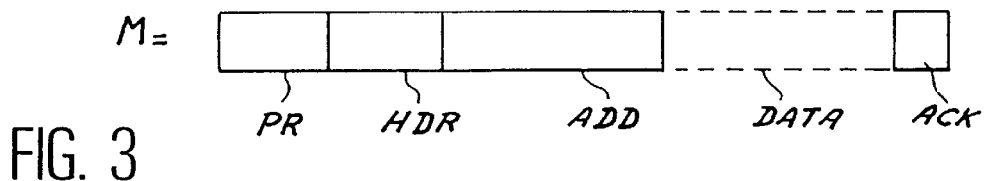
FIG. 3 gives the typical composition of a message to be transmitted between the transmitter and the receiver of FIG. 1.

The message M to be transmitted has the general structure shown in FIG. 3 with, notably, a preamble PR, a header HDR, an address zone ADD comprising the address of the transmitter of the message and that of the addressee receiver, a data zone DATA and an acknowledgment zone ACK wherein the transmitter of the message M indicates whether or not it wishes to receive an acknowledgment message in response to the message M that has been sent.

As indicated further above, the disturbances of the transmission line CP, that are likely to affect the message M to be transmitted, are firstly the parasitic recursive pulses that interfere with certain bits of the message and modify its amplitude to the point of making the message M incomprehensible to the receiver AR and, secondly, the line attenuation of the line CP between two devices that are distant from each other, which reduces the level of all the bits of the message to a value below the detection threshold of the receiver AR.

Whatever may be the origin of the disturbances of the transmission line CP, the correction method according to the invention starts with a first step of transmission by the transmitter AE, at a first transmission rate V1, of the message M to be transmitted with a request for acknowledgment ACK by the receiver AR.

If the acknowledgment ACK returns to the transmitter AE, then the message M has been accurately received by the receiver AR, either because the disturbances do not exist or because their intensity is too low to make the message M indecipherable.

If not, i.e. if the acknowledgment ACK is not received by the transmitter AE because of poor reception of the message M by the receiver AR due to disturbances, the transmitter AE sends a correction message MC, that is synchronous with the mains frequency, at another transmission rate V2, with a request for obligatory acknowledgment ACK' from the receiver AR, and that contains information elements and a correction algorithm AC set up by the transmitter AE by comparison between the bits sent and the bits actually transmitted on the line CP.

Figure 2:
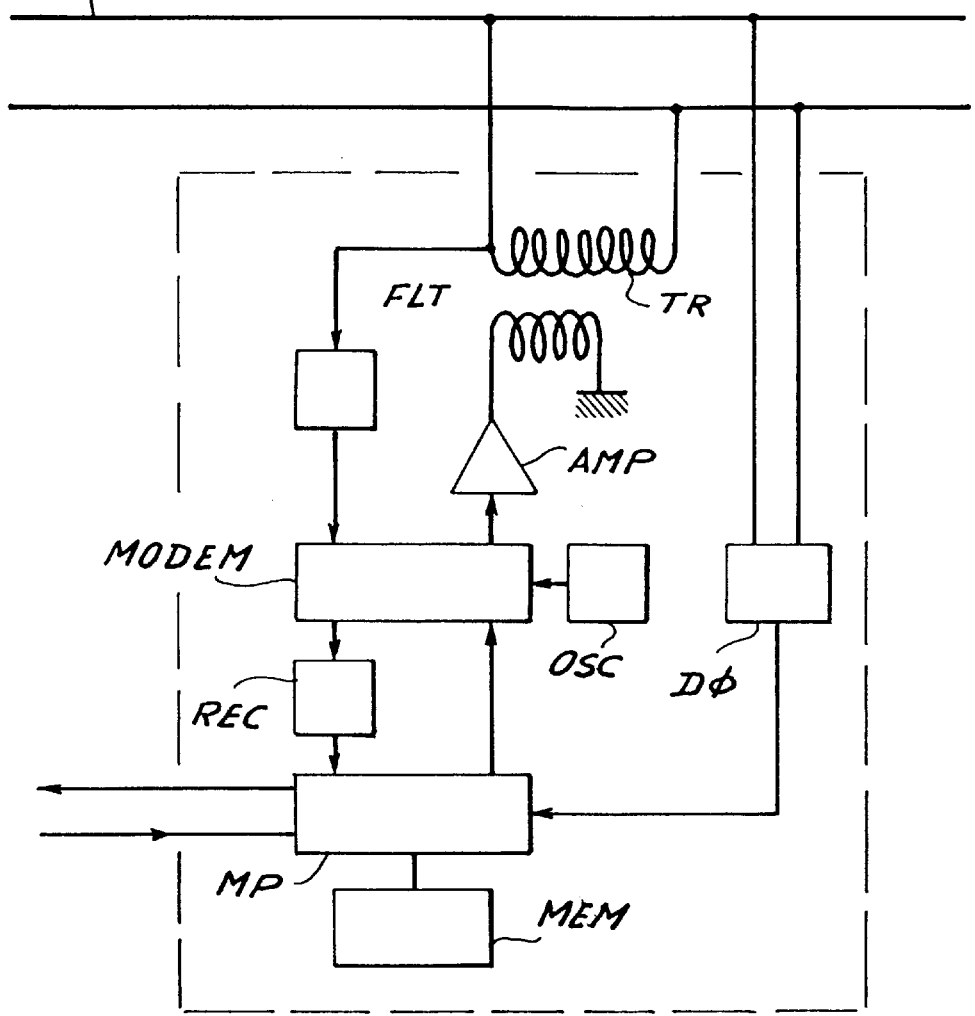
FIG. 2 is a drawing of the transmitter and the receiver of FIG. 1.

To carry out these operations, the transmitter AE is constituted as shown in FIG. 2.

The device has a microprocessor MP provided with its working and program memories MEM in order to send control messages, receive messages and process these received messages. This circuit has its own working programs which may be controlled by the user by means of a panel comprising a control keyboard and a control screen. The system can also be designed so that the microprocessor MP is controlled by a personal microcomputer. The user can then define the operating programs of the circuit at will.

Apart from the microprocessor MP, the circuit has the means needed to prepare the messages to be transmitted on the line CP of the carrier current. These means preferably comprise an oscillator OSC to set up a carrier frequency. The output of the oscillator is applied, through a modulator/demodulator MODEM, to an amplifier AMP and the output of the amplifier AMP is applied to the primary winding of a transformer TR whose secondary winding is connected to the carrier current electrical distribution line CP.

The information elements that come from the line CP arrive by the transformer TR and are transmitted to a filtering cell FLT making it possible to detect the presence of a modulation on the network. The output of the filtering cell is connected to the MODEM and shaped. The output of this circuit is connected to the microprocessor MP. The messages received from the network of the other devices of the installation are demodulated and converted into sequences of binary pulses that can be exploited by the microprocessor MP.

Between the modulator/demodulator MODEM and the microprocessor MP, there is interposed a circuit REC for the recognition of the rate of transmission of the messages received. This circuit, which is indispensable for devices working at several transmission rates, is described in detail in the European patent application No. 93 401231.1, which is hereby incorporated by reference.

Figure 5:
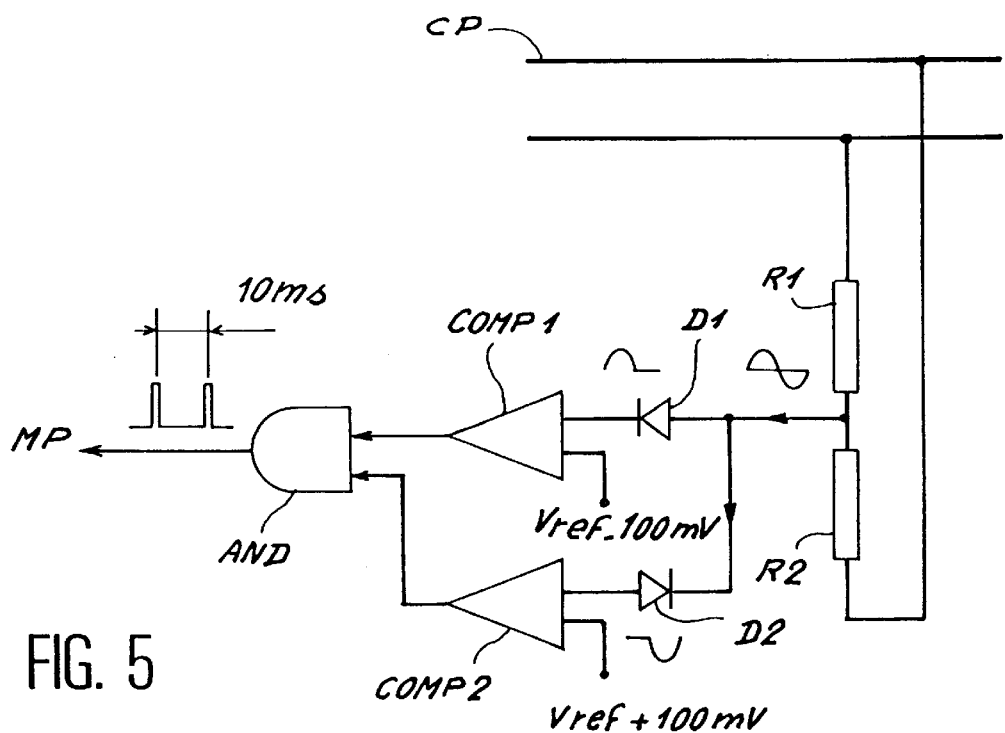
FIG. 5 is a drawing of the detector of crossings through zero pertaining to the drawing of FIG. 1.

In order to enable the sending of the bits of the messages, notably the correction message MC, in synchronism with the frequency of the mains supply system, the circuit of FIG. 2 comprises a detector D0 of passages or crossings through zero made by the mains current. This detector is described with reference to FIG. 5. A fraction of the mains voltage is picked up by a bridge of resistors R1/R2 and then rectified for the positive half-wave by the diode D1 and for the negative half-wave by the diode D2. Each component thus obtained is compared respectively with a voltage Vref−100 mV and a voltage Vref+100 mV, for example, by comparators COMP1 and COMP2, the outputs of which are applied to the input terminals of an AND gate referenced AND. Pulses synchronous with the frequency of the mains are then obtained at output, these pulses having a period of 10 ms for a frequency of 50 Hz for example. The voltage Vref is equal to the mains voltage multiplied by the factor R2/(R1+R2).

Of course, the receiver AR has a constitution equivalent to the one that has just been described with reference to the transmitter AE.

Figure 4:
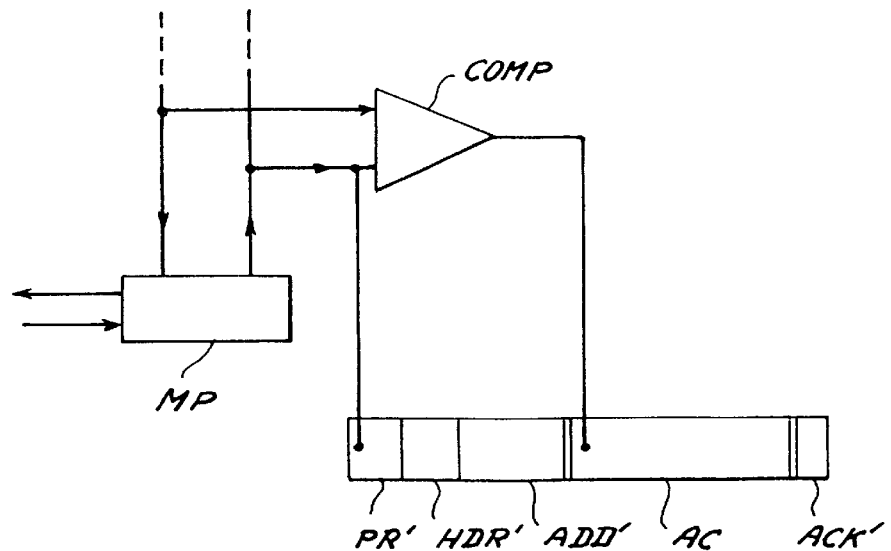
FIG. 4 is a drawing illustrating the composition of the correction message sent by the transmitter of FIG. 1.

The composition of the correction message MC as well as the way in which it is formed are explained in FIG. 4. Since the message M to be transmitted, the correction message MC, has a preamble PR', a header HDR', an address zone ADD' containing the address of the transmitter of the message and that of the addressee receiver. These three zones may extend, for example, over 64 bits. There then follows a zone corresponding to the proper correction algorithm AC, constituted for each of the 64 first bits by a correction bit equal to 1 if the bit actually transmitted on the line CP is identical to the bit sent by the microprocessor MP, and equal to zero if these two bits differ because of disturbances. The correction bit is given by a comparator COMP whose input terminals are connected to the transmission and reception channels of the circuit of FIG. 2. The correction algorithm AC therefore has the same length as the first three zones of the message. Finally, the correction message MC ends with an acknowledgment zone ACK'.

The correction algorithm can also be constituted by the corrector code known as the Hamming code which is based on the distance between two bits corresponding to the confidence coefficient attributed to the transmission.

With the correction algorithm AC, a means is available for determining the origin of the disturbances affecting the transmission of the messages. Indeed, if the correction algorithm AC is constituted only by 1 bits, then all the bits sent out on the line are transmitted accurately. This means, therefore, that there are no parasitic pulses but only a simple attenuation of the line. On the contrary, the presence of correction bits equal to zero means that there are parasitic pulses on the line CP, alone or combined with a line attenuation.

This possibility of identifying the nature of the disturbances then makes it possible to define the most appropriate correction to be made.

In a first example, where the disturbances include parasitic recursive pulses, the correction algorithm AC will indicate errors detected; the transmitter AE, after having received the acknowledgment ACK' of the correction message MC, sends the message M to be transmitted, at the other transmission rate V2, synchronously with the frequency of the mains, with a request for acknowledgment ACK from the receiver AR.

This other transmission rate V2 is chosen so as to improve the quality of the transmission while minimizing the effects of the parasitic pulses. If the frequency of recurrence of the parasitic pulses is not excessively high, the rate V2 will generally be lower than the first transmission rate V1. However, if the frequency of the parasitic pulses is high, it will be advantageous to increase the rate V2 so that the bits of the messages can be transmitted between the parasitic pulses.

Usually, the change in transmission rate, which will be repeated if necessary, will be sufficient to enable accurate reading of both the correction message MC and the message M to be transmitted. However, for the sake of security, if there is any doubt concerning a bit of the message M to be transmitted, the receiver AR will carry out a correction operation by means of the correction algorithm AC that it has previously received and acknowledged. In this operation, the synchronization with the mains frequency fulfills a basic role since it is this synchronization that will have enabled the recognition of the correction message MC, with confirmation by a header HDR' specific to the corrective character of the message, and the storage of both the correction algorithm AC and its synchronism with the mains frequency. Furthermore, the synchronization of the message M to be transmitted also enables the accurate application of the correction algorithm AC by the identification, in the sequence, of the correction bit corresponding to the bit to be corrected.

Naturally, if the transmitter AE does not receive any acknowledgment ACK' of the correction message MC, the method is followed by the dispatch of a new correction message at a new transmission rate. If the correction algorithm of this new message again indicates an error in the transmission, then the above method is resumed. On the contrary, if the new correction algorithm indicates no errors in the transmission, then it means that there is a line attenuation which was combined with the parasitic pulses whose effects are then eliminated.

In this case, and also when the disturbances are a simple attenuation along the transmission line CP, the correction algorithm AC shows no error detected; the transmitter AE, after having received the acknowledgment ACK' of the correction message MC, sends the message M to be transmitted at the other transmission rate V2, with a request for acknowledgment ACK from the receiver AR.

When there is no acknowledgment ACK' of the correction message MC, the detector device sends the message M to be transmitted at yet another configuration of transmission with a request for acknowledgment ACK from the receiver AE. This other transmission configuration is defined either by a third transmission rate V3 or by a new value of the gain G of the amplifier AMP provided with an automatic gain control system.

The last-mentioned operation is repeated as many times as necessary until the requested acknowledgment ACK is obtained or until a counter of repetitions present in the message M sent out by the transmitter AE has run its full course.

What is claimed is:

1. A method for the correction of a message to be transmitted between a transmitter and a receiver that are distributed on an information transmission line of an installation supplied by the mains system, said line being the site of disturbances liable to affect the transmission of said message, and each device being capable of sending and receiving data elements at a minimum of two transmission rates, wherein said correction method comprises the following steps:

a) the sending, by the transmitter, at a first transmission rate, of the message to be transmitted with a request for acknowledgment from the receiver, b) when there is no acknowledgment owing to said disturbances, the sending, by the transmitter, at another transmission rate, of a correction message that is synchronous with the frequency of said mains with a request for obligatory acknowledgment from the receiver, and that contains information elements and a correction algorithm prepared by the sender by comparison between the bits sent and the bits actually transmitted on the line, then, if the correction algorithm indicates no errors in the transmission, c) when there is an acknowledgment of the correction message, the sending, by the transmitter, at said other transmission rate, of the message to be transmitted with a request for acknowledgment from the receiver, or d) when there is no acknowledgment of the correction message, the sending, by the transmitter, with yet another transmission configuration, of the message to be transmitted with a request for acknowledgment from the receiver.

2. A correction method according to claim 1, wherein said step d) is repeated until the reception, by the transmitter, of the requested acknowledgment or until a repetitions counter has completely run its course.

3. A method for the correction of a message to be transmitted between a transmitter and a receiver that are distributed on an information transmission line of an installation supplied by the mains system, said line being the site of disturbances liable to affect the transmission of said message, and each device being capable of sending and receiving data elements at a minimum of two transmission rates, wherein said correction method comprises the following steps:

a) the transmission, by the transmitter, at a first transmission rate, of the message to be transmitted with a request for acknowledgment from the receiver;

b) when there is no acknowledgment because of said disturbances, the transmission, by the transmitter, at another transmission rate, of a correction message that is synchronous with the frequency of said mains, with a request for obligatory acknowledgment from the receiver, and that contains information elements and a correction algorithm prepared by the transmitter by comparison between the bits sent and the bits actually transmitted on the line, then, if the correction algorithm indicates at least one error detected, c) when there is an acknowledgment of the correction message, the sending, by the transmitter, at said other transmission rate, of the message to be transmitted, synchronously with the frequency of the mains system with a request for acknowledgment from the receiver, or d) when there is no acknowledgment of the correction message, the retransmission by the transmitter, at yet another transmission rate, of a correction message that is synchronous with the frequency of the mains, with a request for obligatory acknowledgment by the receiver, and that contains other information elements, and another correction algorithm prepared by the transmitter by comparison between the bits sent and the bits actually transmitted on the line, then, if said other correction algorithm indicates at least one error detected, the resumption of the method after the step b), or, if said other correction algorithm indicates no error detected, then, if there is an acknowledgment of the correction message, the sending, by the transmitter, at said other transmission rate, of the message to be transmitted with a request for acknowledgment from the receiver, or if there is no acknowledgment of the correction message, the sending, by the transmitter, with yet another transmission configuration, of the message to be transmitted with a request for acknowledgment from the receiver.

4. A correction method according to claim 3 wherein, in the event of doubt concerning at least one received bit of the message to be transmitted, the receiver carries out a correction operation by means of the correction algorithm of the previously received and acknowledged correction message.

5. A correction method according to claim 4, wherein said step d) is repeated until the reception, by the transmitter, of the requested acknowledgment or until a repetitions counter has completely run its course.

6. A correction method according to claim 3, wherein said step d) is repeated until the reception, by the transmitter, of the requested acknowledgment or until a repetitions counter has completely run its course.

7. A method for the correction of a message transmitted on the mains power supply system, comprising the steps:

a) a transmitter sends a control message at a first transmission rate, requesting acknowledgment of said control message;

b) if no acknowledgment is received, said transmitter sends a new correction message and request for acknowledgment of said correction message, wherein said new correction message contains bits which indicate if parasitic pulses have been detected and wherein said new correction message is sent at a new transmission rate and in synchronism with the frequency of the mains supply system;

c) if no acknowledgment is received, said transmitter sends successive new correction messages at respective new transmission rates and in synchronism with the frequency of said mains supply system until an acknowledgment of said correction message is received or a preset number of attempts have been made;

if acknowledgment is received, and the most recent of said correction messages indicated that parasitic pulses had not been detected, then said transmitter sends said control message at said respective transmission rate for which an acknowledgement is received;

if acknowledgement is received, and the most recent of said correction messages indicated that parasitic pulses had been detected, then said transmitter sends said control message at said respective transmission rate for which an acknowledgement is received and in synchronism with the frequency of the mains supply system.

8. A method for communicating over mains power lines which carry AC power at a known power line frequency, comprising the steps of:

(a) initially transmitting a message over the mains power lines at a first bit rate, without synchronization to the power line frequency; and (b) if no acknowledgement is received after said step (a), then retransmitting at least part of the message, at a second bit rate which is lower than said first bit rate, with error correction coding and with synchronization to the power line frequency.

9. The method of claim 8, wherein if no acknowledgement is received after said step (b), then said step (b) is repeated again.

10. A method for communicating over mains power lines which carry AC power at a known power line frequency, comprising the steps of:

(a) initially transmitting a message over the mains power lines at a first carrier frequency and at a first bit rate, without synchronization to the power line frequency; and (b) if no acknowledgement is received after said step (a), then retransmitting at least part of the message, at a second carrier frequency which is different from said first carrier frequency and at a second bit rate which is lower than said first bit rate, with error correction coding and with synchronization to the power line frequency.

11. The method of claim 10, wherein if no acknowledgement is received after said step (b), then said step (b) is repeated again.

* * * * *